United States Patent [19]

Schwäbe

[11] 4,155,324

[45] May 22, 1979

[54] DEVICE TO INDICATE SYMBOLS ON CONTROL LEVERS

[75] Inventor: Jürgen Schwäbe, Korschenbroich, Fed. Rep. of Germany

[73] Assignee: International Harvester Company, Chicago, Ill.

[21] Appl. No.: 930,847

[22] Filed: Aug. 4, 1978

[30] Foreign Application Priority Data

Oct. 24, 1977 [DE] Fed. Rep. of Germany ....... 2747589

[51] Int. Cl.² .......................... G05G 1/10; G05G 1/00; B60K 23/08
[52] U.S. Cl. ................................. 116/28.1; 116/283; 74/473 R
[58] Field of Search ............... 116/1, 28 R, 44, 114 R, 116/114 A, 114 G, 124 R, 124 A, 124 M, DIG. 20, DIG. 21, DIG. 28, 130, 131, 135; 74/471, 473 R, 473 C, 475, 488, 489, 491, 523, 535, 537, 538, 566

[56] References Cited

U.S. PATENT DOCUMENTS

| | | | |
|---|---|---|---|
| 3,237,591 | 3/1966 | Pichel | 116/124 R |
| 3,769,482 | 10/1973 | New | 116/124 L X |
| 3,845,736 | 11/1974 | Golbeck | 116/124 R |
| 3,896,759 | 7/1975 | Ogura | 116/124 R |
| 3,901,097 | 8/1975 | Williams | 74/473 R X |
| 3,929,092 | 12/1975 | Ogura | 116/DIG. 2 |
| 4,077,276 | 3/1978 | Knox | 74/475 |

FOREIGN PATENT DOCUMENTS 2145241 3/1973 Fed. Rep. of Germany ...... 116/124 M

Primary Examiner—Donald Watkins
Attorney, Agent, or Firm—Raymond E. Parks; Frederick J. Krubel; F. David AuBuchon

[57] ABSTRACT

A two and four wheel drive indicator is provided in a push-pull handle that is used for conditioning a vehicle for either two or four wheel drive operation. The indicator is actuated by a slidable rod within the handle which comes into contact with a base or supporting surface for the handle as the handle is pushed toward the base or supporting surface. A symbol, representing the four wheel drive condition, appears on a cover plate on the handle whenever the handle is actuated to condition the vehicle for a four wheel drive operation.

6 Claims, 9 Drawing Figures

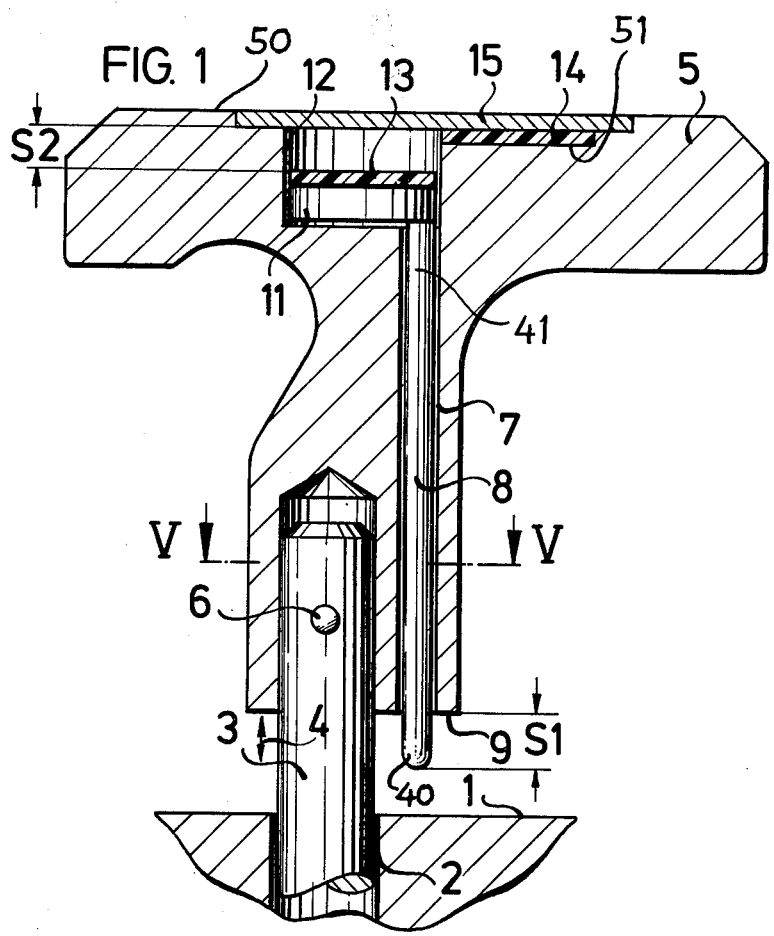
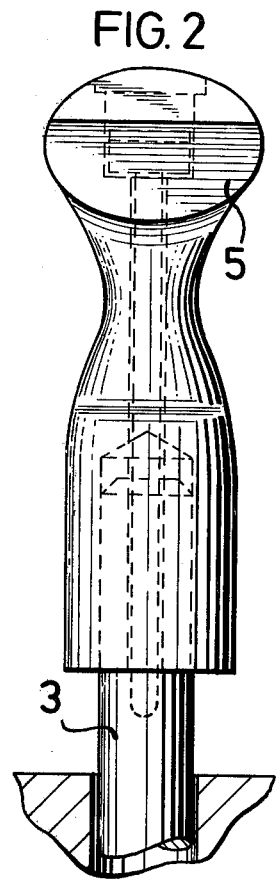
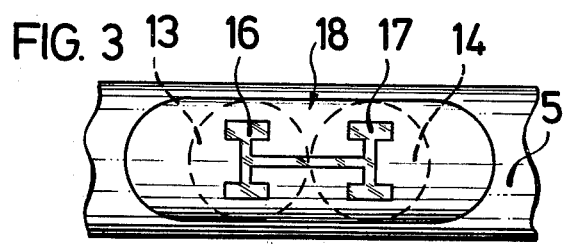
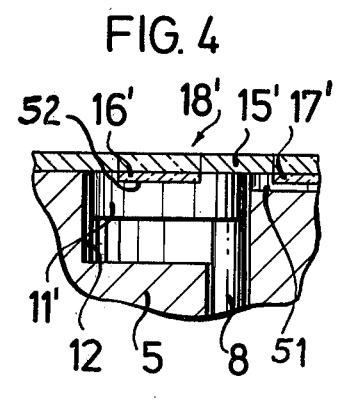
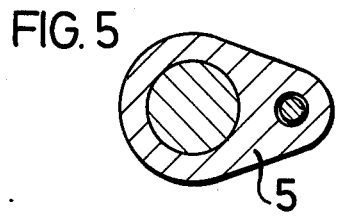

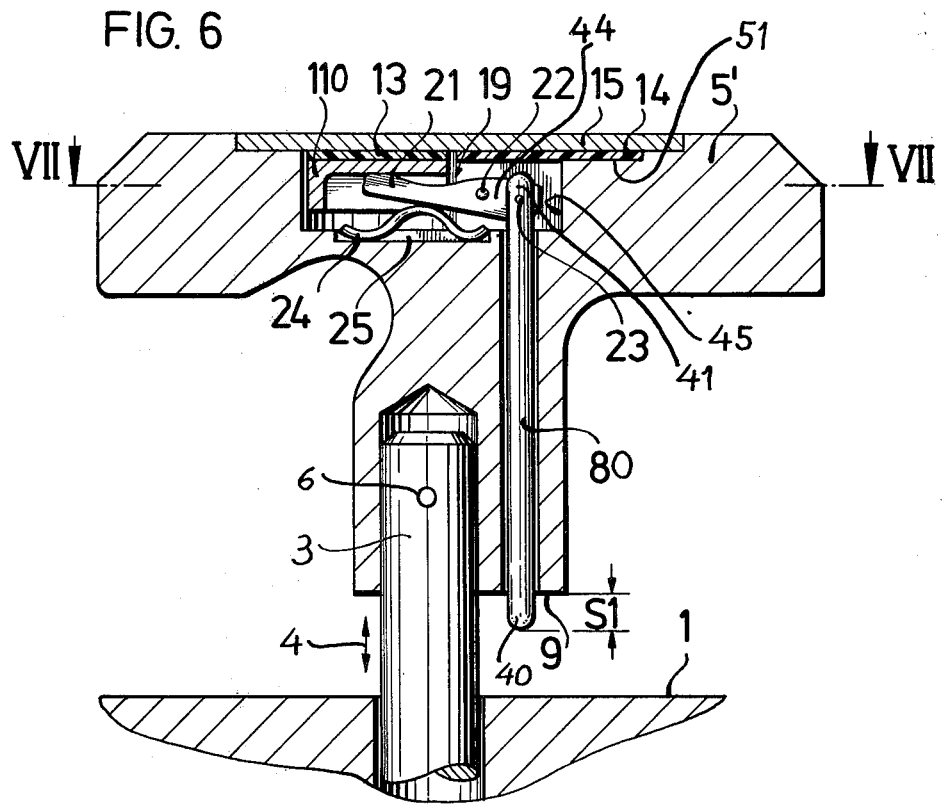
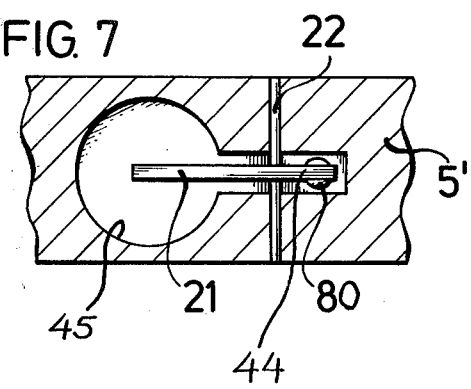

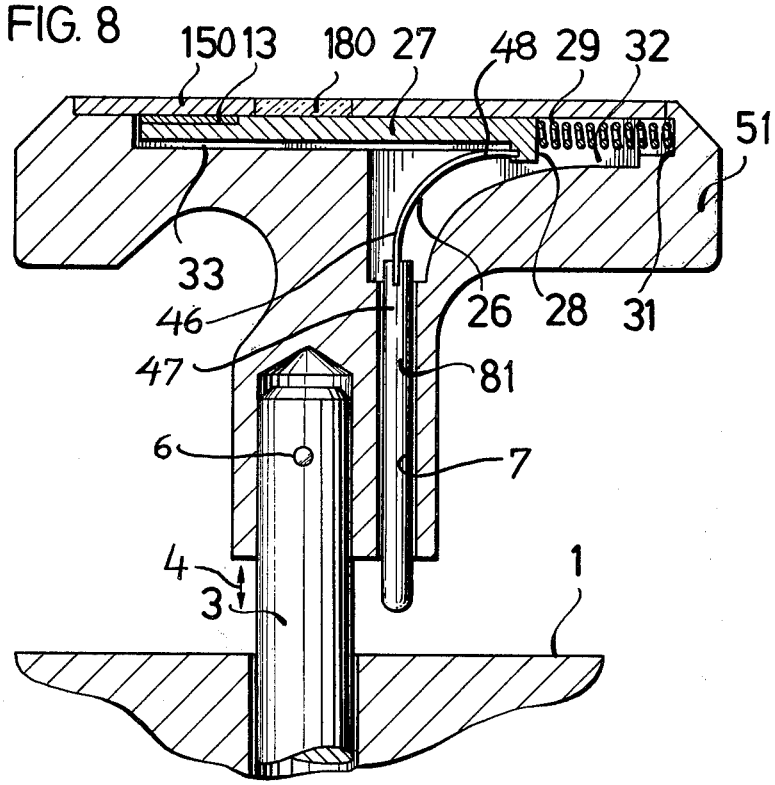
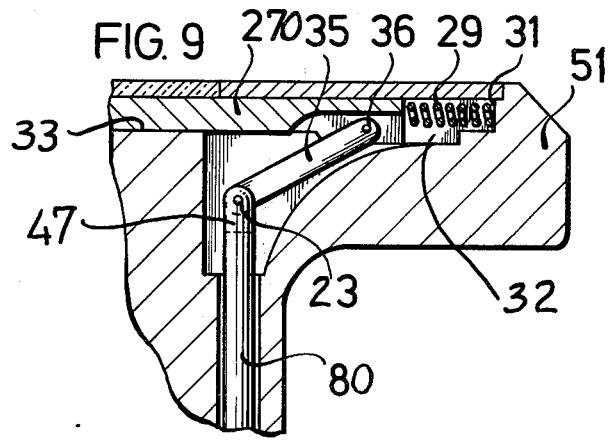

DEVICE TO INDICATE SYMBOLS ON CONTROL LEVERS

BACKGROUND OF THE INVENTION

This invention relates to an indicator for use in a push-pull type of control lever that permits a visual determination of the drive condition of a vehicle, in particular a four wheel drive vehicle.

DESCRIPTION OF THE PRIOR ART

As shown in U.S. Pat. No. 2,549,096—Jacobi—Apr. 17, 1957, in the motor vehicle industry it is common practice to associate an indicator plate with a gear shift lever, to indicate the gear speed ratio in which the gear shift lever has been shifted. According to the symbol representation on the indicator plate, the operator has to shift the control lever through various positions to engage the gears of a transmission. One known symbol representation which is used, is an "H" where the gear shift lever is moved in forward or rearward directions along the path of the H on a more or less horizontal plane. However, in four wheel drive vehicles there is an additional gear shift lever which is movable in a vertical direction for engaging or disengaging the four wheel drive.

FIELD OF THE INVENTION

The invention is based on the objective of providing an indicator device means for indicating a two wheel or a four wheel drive condition of the vehicle on a push-pull lever which is movable linearly or vertically, to and from a base or wall surface.

SUMMARY OF THE INVENTION

According to the invention a guide rod is provided inside a handle of a push-pull control lever, which contacts a surface upon the movement of the control lever to condition the vehicle for four wheel drive and takes up a position indicating the engaged four wheel operating condition of the vehicle; and when the handle is moved in the opposite direction, the guide rod takes up a non-indicating position showing that the vehicle is conditioned for two wheel drive operation. By applying the means described in this invention, a symbol illuminating slide is automatically moved in such a position, when the control lever is shifted, that the operator can recognize at once, whether the four wheel drive unit is in engaged or disengaged operating condition. For that purpose only a relative movement has to be produced between the push-pull control lever handle and the guide rod when shifting the control lever. The relative movement between the handle and the guide rod causes the illuminating means or slide to illuminate the symbol on a cover plate to the engaged position or to move the illuminating means to a non-indicating position showing the four wheel drive disengaged position, depending on the direction of movement of the push-pull control handle. Preferably the illuminating means is arranged inside a handle of the control lever. Such handles are especially used in cases where a control rod is adjusted in a linear direction. The relative movement required between the handle and the guide rod is achieved in a simple manner by slidably mounting the guide rod in a bore provided in the handle. The lower end of the guide rod is designed to project beyond the remote or bottom side of the handle a maximum distance that is equivalent to the maximum permissible travel of the upper end of the rod within the handle from the non-indicating position of the illuminating slide to the indicating position. The handle is moved in a direction toward the base or wall of the vehicle through which the control rod projects, until the depending or projecting end of the guide rod contacts this surface. Upon continued movement of the handle, the guide rod abuts the floor so that there is now relative movement between the handle and the guide rod until the control rod reaches the four wheel drive engaged position. The illuminating slide can be constructed in a variety of designs, for example the illuminator can be in the form of a cylindrical disk which is slidable in a complimentary bore or opening provided in the handle. A symbol indicator or cover plate can also be of a variety of designs. For example, the symbol plate can be provided with a marking for two and four wheel drive operating conditions, or it can be provided with a symbol showing only the four wheel drive condition, or it can be provided with an illuminated two wheel drive symbol and a non-illuminated four wheel drive symbol which unites to form a four wheel drive engaged condition for the vehicle. For the purpose of a satisfactory visual determination, it is of advantage if the illuminator and the symbol or indicator plate are manufactured of colored plastic material or at least one is provided with a colored or luminescent material. When the push-pull handle is actuated, the illuminating slide is pressed against the symbol or cover plate so that the symbol is illuminated and thereby indicates the engaged operating condition of the vehicle.

A modification of the invention features a transversely slidable illuminator which is located below the cover plate. A compression spring urges the slide in one direction while a link or spring urges the slide in an opposite direction upon the guide rod contacting the base or wall surface. In another embodiment of the invention the guide rod is linked to a bell crank lever which raises and lowers the illuminator to and from the symbol plates.

BRIEF DESCRIPTION OF THE DRAWING

In order that the invention may be readily understood and put into practical effect, reference will now be made to the various figures of the drawing in which:

FIG. 1 is a cross section through a control lever equipped with a handle featuring an indicating device according to the invention;

FIG. 2 is a side view of the left side of FIG. 1;

FIG. 3 is a top view of the handle of FIG. 1 with parts broken away;

FIG. 4 is a longitudinal partial cross section of a modified embodiment of the indicating device;

FIG. 5 is a view taken on line V—V of FIG. 1;

FIG. 6 is another modified embodiment of the indicating device in the longitudinal cross section;

FIG. 7 is a view taken on line VII—VII of FIG. 6;

FIG. 8 is a further modified embodiment of the indicating device; and

FIG. 9 is yet another embodiment of the indicating device.

DESCRIPTION OF THE PREFERRED EMBODIMENT

In FIG. 1 there is shown a base or a supporting wall 1 which is located in a cabin or vehicle driver's compartment of a four wheel drive vehicle. A small opening 2 is provided in the base 1 through which a control lever 3 is connected to an operating unit, such as for example a two and four wheel drive selector mechanism, not shown. The control lever or rod is adjusted in a push-pull or linear direction as indicated by the arrow 4. The invention is not limited to a floor or wall mounted lever, the lever can be mounted for actuation in both horizontal and vertical directions or it can be mounted in an oblique direction in the operator's cabin. For actuating activities a handle 5 is provided on the end of the control lever or rod 3. The handle 5 is mounted to the control lever 3 by any suitable means such as a pin 6. There is provided, parallel to the control lever 3, a bore or opening 7 that extends through the handle 5. In this bore 7, a guide rod 8 is slidably mounted. In the position of the handle 5 and control lever 3 shown in FIG. 1, the guide rod 8 has a projecting end 40 which projects beyond the bottom or operator remote surface 9 of the handle by a dimension S1 which is equal to or a little less than dimension S2. The opposite or top end 41 of rod 8 is mounted to a slide member 11 which may be in the form of a disk or an oval, or any other shape suitable for sliding in an opening. The slide 11 is located in an opening 12 in the handle 5. A luminescent indicator or colored signal plate 13 is connected to the top of the slide 11, which interacts with a symbol indicator plate 15 in a manner to be described in more detail further on. The symbol or indicator plate 15 may also be manufactured of a colored plastic material and is located in the top or operator proximate side 50 of the handle 5. To the right of the opening 12 there is a second luminescent indicator or colored signal plate 14 which is mounted in a cavity 51 in the handle and is covered by the cover plate 15. The second luminescent indicator plate 14 constantly illuminates the two wheel drive condition of the vehicle. It may be eliminated and a non-illuminated condition of the symbol indicator plate 15 would indicate the two wheel drive engagement of the vehicle.

The cover plate 15, as shown in FIG. 3, is provided with a two and four wheel drive symbol unit 18, consisting of two symbol sections 16 and 17 which respectively represent the front and rear wheels of a vehicle. The two symbol sections 16 and 17 are provided with a transparent or structurally transparent appearance, while the other portion of the cover plate 15 is opaque or non-transparent.

Normally, the control lever 3 is in the position shown in FIG. 1 and the symbol section 17, if an illuminator plate 14 is provided beneath the symbol 17, indicates that the vehicle is in two wheel drive operation. In this position the slide 11 is moved a distance S2 away from the cover plate 15 so that the operator can only see the symbol section 17 which is illuminated or colored by the indicator plate 14. With this arrangement it is possible to indicate that one set of wheels, such as the rear wheels of a four wheel driven vehicle, are engaged. The other symbol section 16 representing a second set of powered wheels does not become visible or illuminated until the slide 11 and the signal plate 13 are moved distance S2 to the symbol 16 on the cover plate 15. The absence of a color signal in the symbol section 16 implies that the four wheel drive is not engaged. When it is desired to engage the four wheel drive, the operator moves or pushes the handle 15 and control lever 3 toward the base 1. As a result of the movement, the depending end 40 of the guide rod 8 reaches the base 1, while the handle can still be moved further toward the base. As a result there is a relative movement between the guide rod 8 and the handle 5 causing the signal or illuminator plate 13 on the slide 11 to be moved towards the symbol 16 on the cover plate 15. The signal plate 13 now illuminates or colors the left hand symbol 16 while the right hand symbol 17 continues to be illuminated by the stationary signal plate 14. The illumination or coloring or uniting of both sections 17 and 16 of the symbol unit 18 indicates that the vehicle is in four wheel drive operating condition.

DESCRIPTION OF THE MODIFIED EMBODIMENT OF FIG. 4

The modified embodiment according to FIG. 4 features a cover plate 15' which is of a complete transparent material. The two and four wheel drive symbols 16', 17' replace the signal plates 13 and 14. A luminescent or colored symbol 16' is mounted in a cavity 52 in the slide 11' and a luminescent or colored symbol 17', representing the two wheel drive condition, is mounted either to the bottom of the transparent plate 15' or in the cavity 51 provided in the handle 5 for that purpose. When the slide 11' is moved into the position shown in FIG. 4, the four wheel drive symbol 16' shows through the transparent cover plate 15' and together with the permanently visible two wheel drive signal symbol 17' form a unitary four wheel drive symbol unit 18'.

DESCRIPTION OF THE MODIFIED EMBODIMENT OF FIG. 6

The modified embodiment shown in FIG. 6 differs from the FIG. 1 embodiment inasmuch as guide rod 80 is pin connected to a bell crank lever arm 19. The bell crank lever 19 is pivotally mounted in an opening 45 provided in handle 5' by means of a pin 22 supported in the handle 5'. One arm 21 of the bell crank lever 19 is linked to slide 110 while the other end 44 is linked to the upper end 41 of guide rod 80 by means of pin 23. The free or bottom end 40 of guide rod 80 projects beyond the remote side 9 of the handle 5' by the dimension S1. The slide 110 carries signal plate 13, signal plate 14 is mounted in cavity 51 in handle 5', and cover plate 15 covers the bore 45. The one lever arm 21 is acted upon by a leaf spring 24 which is supported in a recess 25 provided in the bottom of the bore 45. The modified indicating device shown in FIGS. 6 and 7 is designed in a manner with the slide 110 indicating the four wheel drive engaged condition while the handle 5' is in the pulled away or fro position with respect to the surface 1. When the handle 5' is moved toward the surface 1, the slide 110 will take a non-indicating position whereby only the indicator signal plate 14, on the right side of the handle, will show through the cover plate 15 indicating a two wheel drive engaged condition of the vehicle. When the free end 40 of guide rod 80 abuts the surface 1, as the handle 5' is moved further toward the surface 1, the relative movement between the guide rod 80 and the handle 5 pivots the bell crank lever arm 21 and pulls the slide 110 and signal plate 13 against the force of spring 24 away from the cover plate 15 into a non-indicating or non-illuminating position. The handle 5' shown in FIG. 6 in combination with the indicator device located therein is thus suitable for applications where the handle 5' and control lever 3 must be pulled to condition the vehicle for four wheel drive engaged operation.

DESCRIPTION OF THE MODIFIED EMBODIMENT OF FIG. 8

The FIG. 8 modified embodiment is characterized by flat or leaf spring 26 which acts on a slide 27. One end 46 of the spring 26 is mounted on the upper end 47 of guide rod 81 which is slidably mounted in bore 7 inside handle 51. The other end 48 of the spring 26 is mounted to the transversely movable slide 27. The left portion of the slide 27 carries the signal plate 13. A cover plate 150 is mounted in the handle 51 and is provided with a transparent portion 180 through which the signal plate 13 becomes visible as the slide 27 is shifted to the right. A compression spring 29 abuts against the right side 28 of the slide 27. The other end of the spring 29 abuts against a shoulder 31 provided in a recess 32 in the handle 51. Another recess or complementary slide opening 33 is provided in the handle 51 for slidably supporting the slide 27. When the handle 51 is pushed toward surface 1, the control rod 81 abuts against the surface and the handle 51 continues moving relative to the guide rod 81, whereby the flat spring 26 pushes against the action of the compression spring 29 and shifts the slide 27 to the position where the signal plate 13 is under the transparent portion 180 of the cover plate 150 thereby indicating a four wheel drive engaged condition of the vehicle. In this arrangement the two wheel drive condition is in the leftward non-indicating position of the slide 27 which is maintained by the action of the compression spring 29 acting on the slide 27 in the pulled away or fro position of the handle 51 relative to the surface 1.

DESCRIPTION OF THE MODIFIED EMBODIMENT OF FIG. 9

The modification of the FIG. 9 structure differs from the structure of the FIG. 8 modification by a connecting rod 35 which replaces the flat spring 26. One end of the connecting rod 35 is pivotally connected to the end 47 of the guide rod 80 by means of the pivot pin 23. The other end of the connecting rod or link 35 is pivotally connected to slide 270 by means of a pin 36. In this embodiment also, the slide 270 is acted upon by the compression spring 29. The operation of this device is equivalent to the FIG. 8 modification.

The invention is not limited to the various embodiments just described. It is operable without the cover plate. The indicator or illuminator or signal device need not be located in a T-shaped handle. It can be easily accomodated in a spherical knob-type handle.

The embodiments of the invention in which an exclusive property or privilege is claimed are defined as follows:

1. A four wheel drive indicator signal for a vehicle, comprising:
    a support surface;
    a handle having one side visible to the operator and a second side adjacent to the support surface;
    a control lever connected to the second side of the handle and extending through an aperture in the support surface and linearly movable to-and-fro for selectively engaging and disengaging the vehicle into and out of four wheel drive operation;
    a guide rod extending parallel to the control lever slidably mounted in the handle and having an end projecting from the second side of the handle and engagable with the support surface after a predetermined distance of movement of the handle toward the support surface;
    a cover plate mounted to the one side of the handle and having means for visually signalling the four wheel drive engaged condition of the vehicle; and
    an illuminating means carried on the other end of the guide rod movable toward the signalling means on the cover plate for illuminating same simultaneously with the projecting end of the guide rod contacting the support surface and the handle moving relative to the guide rod towards the support surface.

2. A four wheel drive indicator signal for a vehicle, according to claim 1, wherein the illuminating means comprise a slide mounted to said other end of the guide rod and slidable guided in an opening in the handle formed to the shape of the slide, and a luminescent indicator is connected to the slide beneath the signalling means.

3. A four wheel drive indicator signal for a vehicle, according to claim 2, wherein a leaf spring connects the slide to said other end of the guide rod, and the slide is slidable transversely to the guide rod in the opening in the handle, and a compression spring opposes the leaf spring and urges the slide and luminescent indicator away from the signalling means.

4. A four wheel drive indicator signal for a vehicle, according to claim 2, wherein a rigid link pivotally connects the slide to said other end of the guide rod, and the slide is slidable transversely to the guide rod in the opening in the handle, and a compression spring urges the slide and luminescent indicator away from the signalling means.

5. A four wheel drive indicator signal for a vehicle, according to claim 2, wherein one arm of a rocker arm link is pivotally connected to said other end of the guide rod and a second arm of the rocker arm link is slidably connected to the slide, and a compression spring urging the second arm and the slide and the luminescent indicator toward the signalling means.

6. A four wheel drive indicator signal for a vehicle, according to claim 2, wherein the opening in the handle extends parallel to the guide rod whereby the slide in the opening slides parallel to the guide rod to and from the signalling means.

* * * * *